E. W. TOADVINE.
SUN SHIELD FOR AUTOMOBILES.
APPLICATION FILED NOV. 16, 1920.
1,427,038.
Patented Aug. 22, 1922.
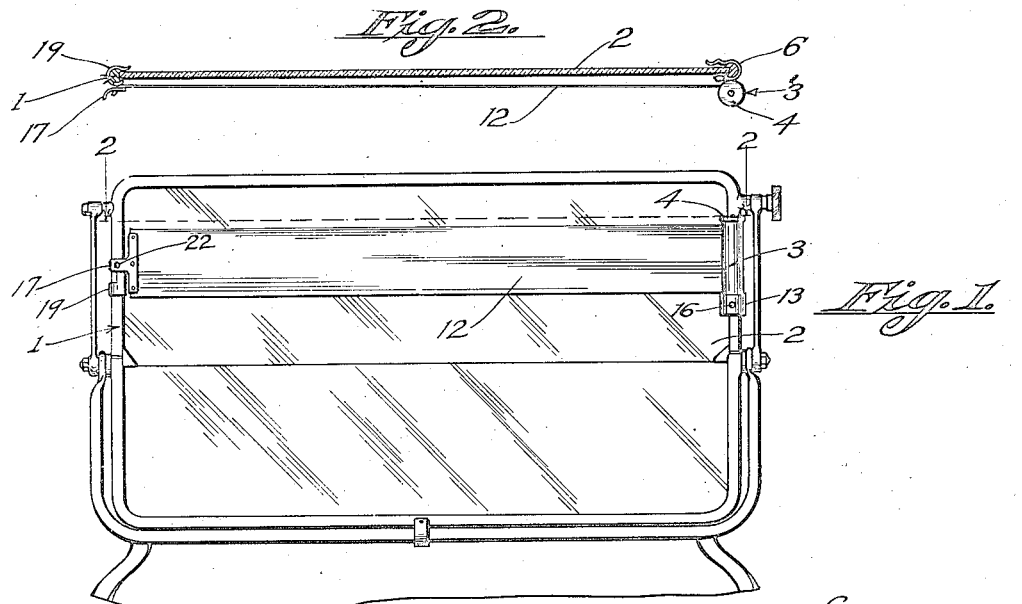
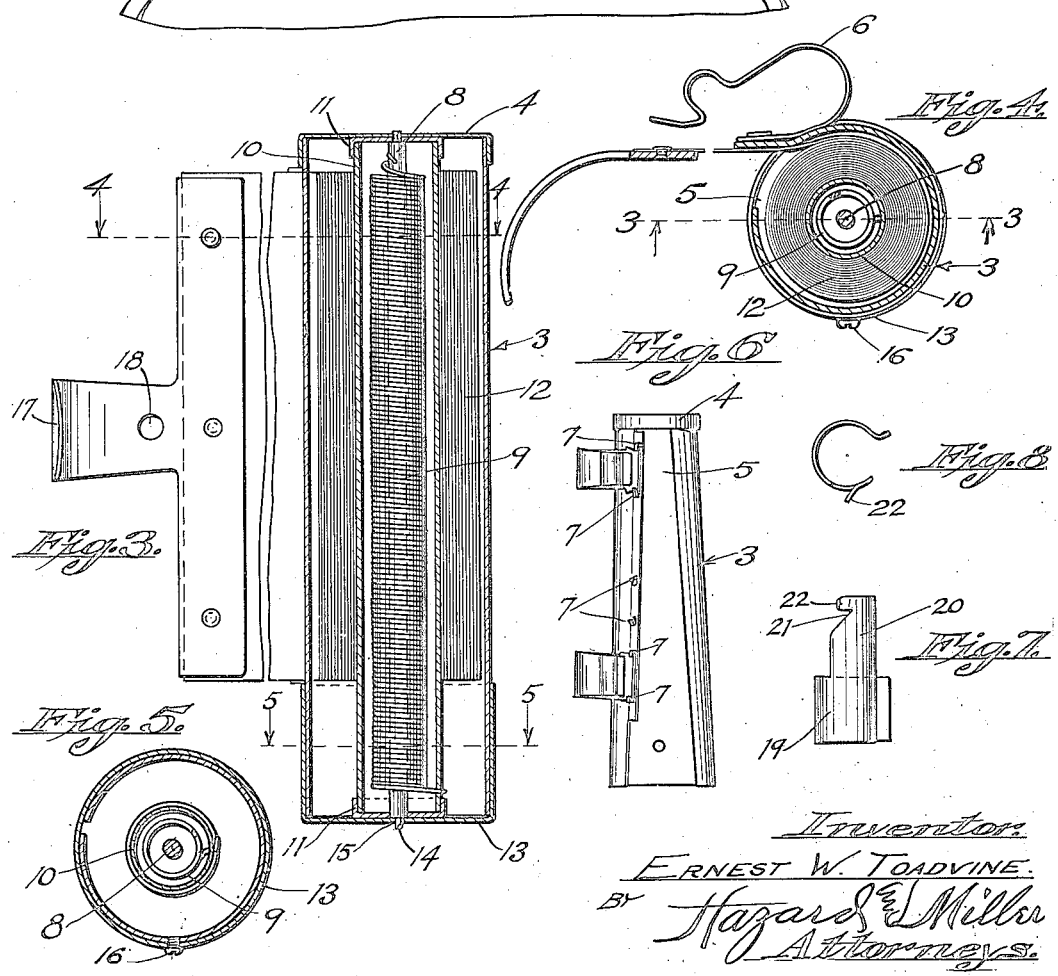
Inventor
ERNEST W. TOADVINE.
By Hazard & Miller
Attorneys

UNITED STATES PATENT OFFICE.

ERNEST W. TOADVINE, OF LOS ANGELES, CALIFORNIA.

SUN SHIELD FOR AUTOMOBILES.

1,427,038.        Specification of Letters Patent.    Patented Aug. 22, 1922.

Application filed November 16, 1920. Serial No. 424,419.

*To all whom it may concern:*

Be it known that I, ERNEST W. TOADVINE, a citizen of the United States, residing at Los Angeles, in the county of Los Angeles and State of California, have invented new and useful Improvements in Sun Shields for Automobiles, of which the following is a specification.

It is the object of this invention to provide a sunshield particularly adapted to be mounted upon the windshield of an automobile.

More particularly it is the object of this invention to provide a sunshield comprising a spring roller mounted at one side of a windshield and having a shade rolled thereon, and adapted to be drawn across the windshield and fastened in position so as to shield the driver's eyes from glare.

The invention will be readily understood from the following description of the accompanying drawings, in which:

Figure 1 is an elevation of a windshield showing the improved sunshield applied thereto.

Fig. 2 is a transverse section on the lines 2—2 of Fig. 1.

Fig. 3 is a longitudinal section through the sunshield casing with the sunshield wound upon its roller.

Fig. 4 is a transverse section on the line 4—4 of Fig. 3.

Fig. 5 is a transverse section on the line 5—5 of Fig. 3.

Fig. 6 is a side elevation of the sunshield casing before assembling the parts.

Fig. 7 is a side elevation of the retaining clip engaged by the sunshield when in its open position.

Fig. 8 is a top plan view of this retaining clip.

The improved sunshield is applicable to an automobile windshield of usual construction which includes the frame 1 supporting the glass plates 2. The sunshield is mounted upon frame 1, the casing carrying the spring roller upon which the shade is wound being mounted at one side of frame 1, and a retaining clip adapted to engage the end of the shade when it is drawn across the windshield being mounted at the opposite side of frame 1. The sunshield is preferably mounted upon the surface of the windshield toward the occupants of the automobile so that the sunshield may be readily manipulated from the seat of the automobile.

The casing carrying the spring roller includes a cylinder 3, having an end cap 4 fixed upon one end thereof, and preferably formed of such resilient material that the edges of the strip transversely curved to form the cylinder, will normally spring apart at the opposite end of the cylinder as clearly shown in Fig. 6. The adjacent edges of the cylinder strip form a slot 5 extending the length of the cylinder. Spring clips 6 are fixed upon the cylinder in longitudinally spaced relation and are adapted to be received around one of the side uprights of frame 1 for supporting the cylinder upon said frame. In order to engage these spring clips, the material forming cylinder 3 is bent upwardly so as to form co-operating clips 7 at spaced points along one of the edges of cylinder 3, and the ends of clips 6 are received beneath these pairs of cooperating clips 7 so that when the latter are bent downwardly upon the clip 6, the parts will be held in position relative to one another.

A rod 8 is received within cylinder 3 with its end journaled in end cap 4, and a coil spring 9 is received around this rod with one end thereof fixed to the rod. The rod and spring are mounted in a tube 10 having end caps 11 through which the rod extends. The opposite end of spring 9 is secured to the tube 10.

The shade forming the sunshield is shown at 12 as a strip of suitable fabric material having one end fixed to the tube 10 so that the shade may be wound upon the tube. With the parts assembled as thus described, the cap 13 is received over the open end of cylinder 3, said cap compressing this end of the cylinder in order that the cap will be held upon the cylinder by the spring tension of the latter. The end of rod 8 projecting beyond the end of tube 10 at the cap 13 is nonrotatably fixed to said end cap by providing the end of the rod with a squared portion 14 received in a squared opening 15 in the end cap.

The shade 12 is wound upon tube 10 with its end projecting through the slot 5 provided in casing 3, and the tube and casing are then held against rotation, while end cap 13 is rotated so as to turn rod 8 and thus tension spring 9. A set screw 16 is then received through end cap 13 and the casing 3 so as to fix these parts relative to one another. When now the shade is withdrawn from tube 10, the spring 9 will tend to reversely rotate the tube so that as soon as the shade is released, it will be automatically rewound within casing 3.

The free end of shade 12 is preferably provided with a hook 17 adapted to be grasped when withdrawing the shade from its casing, and this hook is preferably provided with an aperature 18 adapted to be received over the retaining member mounted upon the opposite side upright of frame 1, so as to hold the shade in operative position.

This retaining member may comprise a spring clip 19 adapted to be received around the upright of frame 1, and terminating at one side in a longitudinal projection 20. This projection at its upper end is notched as shown at 21, and the lip forming the upper portion of said notch is preferably outwardly bent as shown at 22. The retaining clip is so positioned that when the shade 12 is drawn across the windshield, the outwardly bent lip 22 will aline with the opening 18 provided in hook 17, and as a consequence the hook member upon the end of the shade may be readily engaged by the retaining lip 22.

It will be noted that the construction as thus described provides an extremely simple mechanism, whereby a shade may be mounted upon one side of a windshield so as to be readily drawn across the windshield and held in operative position to afford a sunshade. It will also be noted that the construction provides for the automatic withdrawal of the sunshade into its casing mounted at one side of the windshield as soon as the end of the shade is released.

Various changes may be made without departing from the spirit of the invention as claimed:

What is claimed is:

1. A shade strip wound upon a roller, a casing enclosing the same, said casing being longitudinally split, one side thereof being outwardly bent; said casing being provided with a closed end and flaring opposide end; a rotatable closure cap received upon said flaring end and having non-rotatable engagement with the roller shaft, and means to prevent relative rotation of said casing and closure cap.

2. A shade strip wound upon a roller, a casing inclosing the same, said casing being longitudinally split and provided with a closed end and an open end, a rotatable closure cap upon the open end and having non-rotatable engagement with the roller shaft, and means to prevent relative rotation of the casing and closure cap.

In testimony whereof I have signed my name to this specification.

E. W. TOADVINE.